United States Patent Office 3,644,322
Patented Feb. 22, 1972

3,644,322
POLYMERIZATION OF CONJUGATED DIENES AND MONOVINYL AROMATIC COMPOUNDS WITH MULTIFUNCTIONAL POLYMERIZATION INITIATORS
Ralph C. Farrar, Bartlesville, Okla., assignor to Phillips Petroleum Company
No Drawing. Filed Feb. 3, 1969, Ser. No. 796,204
Int. Cl. C08d 1/32; C08f 1/74, 7/04
U.S. Cl. 260—94.2
8 Claims

ABSTRACT OF THE DISCLOSURE

An improved multifunctional polymerization is prepared in a two step process by reacting an organomonolithium compound with a polymerizable additive and then contacting the reaction mixture with a polyvinyl aromatic compound.

---

This invention relates to an improved multifunctional polymerization initiator. In another aspect, it relates to an improved process for polymerizing conjugated dienes or monovinyl-substituted aromatic compounds and mixtures thereof. In another aspect, it relates to an improved polymerization process for employing lower initiator levels to produce a polymeric product with a desired Mooney viscosity value. In still another aspect, it relates to a process for producing hydrocarbon soluble and stable polylithium initiators.

Many dilithium polymerization initiators are well known to the art, but many of these known compounds are not soluble in hydrocarbons, often require a polar diluent for their preparation, and are not sufficiently stable that they can be prepared and stored for very long periods and still retain their activity. They must, therefore, often be prepared and used within a relatively short time.

Multifunctional polymerization initiators can be prepared from an organomonolithium compound, a polyvinyl aromatic compound and a conjugated diene or monovinyl aromatic compound by charging all ingredients initially. By means of such a process, multifunctional initiators which are hydrocarbon soluble and stable can be prepared in a hydrocarbon diluent.

It has now been discovered that if the aforementioned multifunctional polymerization initiators are prepared in a two step process which comprises (1) reacting an organomonolthium compound with a conjugated diene or a monovinyl aromatic additive and then, (2) adding the polyvinyl aromatic compound to the reaction product formed in the first step that an improved multifunctional polymerization initiator is produced.

It is an object of this invention to provide an improved multifunctional lithium based initiator. It is an object of this invention to provide a stable, hydrocarbon soluble initiator so as to enable easy storage thereof. It is still a further object to provide a process for controlling the Mooney viscosity of the polymers produced according to this invention. Other objects, advantages, and features of my invention will be apparent to those skilled in the art from the following discussion and examples herein set forth.

According to the present invention, stable initators containing at least two carbon-lithium bonds are readily prepared. They are branched and the branches are terminated with lithium substituents which serve as reaction sites for polymerization initiation. Branched polymers result when polymerizations are initiated in the presence of these multifunctional polymerization initiators.

The multifunctional polymerization initator produced according to this invention can be employed at much lower initiator levels to produce products with the desired Mooney viscosity value than those initiators prepared when all initiator components are charged initially. Furthermore, when liquid products are desired, initiators prepared according to this invention give lower molecular weight products than are obtained from initiators that are prepared charging the several ingredients initially, and for a given initiator level, polymers produced with an initiator formed by charging all of the ingredients initially have a much higher molecular weight than when the initiators prepared according to the present invention are employed.

The multifunctional polymerization initiators are prepared in a two step process which comprises (1) reacting an organomonolithium compound with a polymerizable additive comprising a conjugated diene or a monovinyl-substituted aromatic compound using from 2 to 15 moles of polymerizable compound per mole of the organomonolithium compound, and (2) adding from 0.15 to 2 moles of polyvinyl aromatic compound per mole of the organomonothium compound and allowing sufficient time for it to react with the reaction product formed in the first step.

In the first step of the process, an organomonolithium compound is reacted with the polymerizable additive in the presence of an inert diluent.

Hydrocarbons or polar compounds can be employed as the diluent and mixtures of polar diluents and hydrocarbons can be employed if desired. Polar diluents are of particular value for the production of conjugated diene polymers if a high vinyl content is desired as well as for preparing random copolymers. Hydrocarbon diluents including paraffins, cycloparaffins, and aromatics generally containing from 4 to 10 carbon atoms per molecule are suitable. Exemplary polar compounds include ethers, thio ethers, tertiary amines, and the like.

Those polymerizable additives utilized for initiator preparation are generally those conjugated dienes containing 4 or 5 carbon atoms per molecule such as 1,3-butadiene, piperylene or isoprene, and monovinyl-substituted aromatic compounds such as styrene or alkylated styrenes containing from 8 to 20 and preferably 8–12 carbon atoms per molecule. Mixtures of these compounds can also be employed.

The organomonolithium compounds that are reacted with the polymerizable additive in step one of this invention are represented by the formula RLi; wherein R is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n - butyllithium, sec-butyllithium, tert - octyllithium, n - decyllithium, n - eicosyllithium, phenyllithium, 2 - naphthyllithium, 4 - butylphenyllithium, 4 - tolyllithium, 4 - phenylbutyllithium, cyclohexyllithium, 3,5 - di - n - heptylcyclohexyllithium, 4-cyclopentylbutyllithium, and the like. The alkyllithium compounds are preferred for employment according to this invention, especially those wherein the alkyl group contains from 3 to 10 carbon atoms.

The polyvinyl aromatic compounds that are employed in the second step of this process and which are added to the reaction product formed in the first step of my invention are those polyvinyl aromatic compounds that have any of the following general formulas:

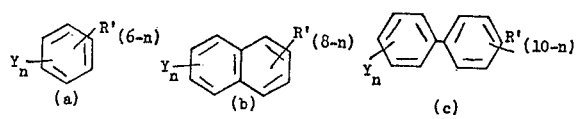

wherein Y is a vinyl group, and wherein each R' is hydrogen or an alkyl group containing from 1 to 4 carbon atoms with a total of the alkyl substituents having not more than 12 carbon atoms, and wherein $n$ is an integer of 2 or 3. The vinyl substituents (b) and (c) can be on either or both rings. Exemplary of suitable polyvinyl aromatic compounds are 1,2-divinylbenzene;
1,3-divinylbenzene;
1,4-divinylbenzene;
1,2,4-trivinylbenzene;
1,3-divinylnaphthalene;
1,8-divinylnaphthalene;
1,3,5-trivinylnaphthalene;
2,4-divinylbiphenyl;
3,5,4'-trivinylbiphenyl;
1,2-divinyl-3,4-dimethylbenzene;
1,5,6-trivinyl-3,7-diethylnaphthalene;
1,3-divinyl-4,5,8-tributylnaphthalene;
2,2'-divinyl-4-ethyl-4'-propylbiphenyl;

and the like. Divinyl aromatic hydrocarbons containing up to 26 carbon atoms per molecule are preferred for employment according to this invention; particularly divinylbenzene in either its ortho, meta, or para isomer and commercial divinylbenzene which is a mixture of said isomers is also quite satisfactory.

As hereinbefore stated, the preparation of my initiators is conducted in the presence of an inert diluent such as a hydrocarbon or polar diluent. The mole ratio of polymerizable additive to organomonolithium compound is in the range of about 2:1 to 15:1, preferably in the range of about 4:1 to 12:1. The mole ratio of polyvinyl aromatic compound to organomonolithium compound is in the range of about 0.15:1 to 2:1, preferably in the range of about 0.25:1 to 1:1.

The temperature for preparing the initiators is generally in the range of about 85° F. to 300° F. The particular time employed for each step will generally depend upon the temperature employed and would be in the range of about 5 seconds to 24 hours for each step. In many instances, a period of less than an hour for each step gives satisfactory results. It is to be understood that a longer reaction time would promote branching in the initiator but an excess reaction period can lead to crosslinking, i.e., gel formation. If the initiator becomes gelled a polymer prepared in its presence will contain gel. It is thus evident that for a given mole ratio of reactant, one skilled in the art can regulate temperature and time in order to obtain a gel-free branched initiator.

The polymerizable additive employed for initiator preparation can all be added in the first step or a portion can be added in the first step and the remainder when the polyvinyl aromatic compound is added in the second step.

The polymers which can be prepared using initiators of this invention are homopolymers made from conjugated dienes containing from 4 to 12 and preferably 4 to 8 carbon atoms per molecule; copolymers of 2 or more conjugated dienes; homopolymers made from monovinyl-substituted aromatic compounds containing 8 to 20 and preferably 8–12 carbon atoms per molecule; copolymers of 2 or more monovinyl-substituted aromatic compounds; and copolymers of conjugated dienes with monovinyl-substituted aromatic compounds.

Homopolymers of conjugated dienes can range from low molecular weight liquids to solid rubbery polymers. Copolymers can be random or block copolymers. This invention provides a method for obtaining rubbery block copolymers of conjugated dienes and monovinyl-substituted aromatic compounds that have high green tensile strength. Multiple blocks of polymerized monovinyl-substituted aromatic compounds are essential to obtaining polymers having high green tensile strength. Resinous block copolymers can be prepared when employing a predominant amount of monovinyl-substituted aromatic compound and a minor amount of conjugated diene. High impact resins with a high degree of clarity and other good properties can be prepared using the multifunctional initiators of this invention. When compounded with ingredients known in the art, the low molecular weight polymers can be used as plasticizers, caulking compounds, sealants, potting compounds, coating compounds and the like; and the high molecular weight polymers have application in adhesive compositions, shoe soles, floor tile, tire tread, hose, belting, gaskets, and the like.

The amount of initiator used in the polymerization process depends upon the particular multifunctional polymerization initiator employed and the type of polymer desired. An effective initiator level is normally in the range of about 0.25 to 100, preferably 1 to 50 milliequivalents of lithium per 100 grams of monomer (Mehm) charged to the polymerization system.

The milliequivalents of lithium can be conveniently determined by an alkalinity titration of a known volume of the reaction mixture containing the multifunctional initiator. Said alkalinity titration employs standardized acid, e.g., HCl, and an indicator such as phenolphthalein to determine the end-point of titration. The alkaline normality thus obtained provides a value for the milliequivalents of lithium per milliliter of reaction mixture containing the multifunctional initiator. The alkalinity concentration (normality) thus determined is then employed for charging a known quantity of milliequivalents of lithium in polymerization recipes employing the multifunctional initiators of this invention.

It is preferred that the polymerization be conducted in the presence of a suitable diluent such as benzene, toluene, xylene, cyclohexane, methylcyclohexane, n-butane, n-hexane, n-heptane, isooctane, mixtures of these and the like. Generally, the diluent is selected from hydrocarbons, i.e., paraffins, cycloparaffins, and aromatics containing from 4 to 10 carbon atoms per molecule.

Polymerization conditions generally known to the art can be suitably employed. The polymerization temperature can vary over a broad range and is generally about —100 to 300° F., and it is preferred to operate at a temperature of at least 85° F.

When a polymerization is conducted in the presence of a multifunctional initiator of this invention, the unquenched polymerization mixture has a branched structure and the branches contain terminal lithium atoms. Treatment with various agents such as carbon dioxide, epoxy compounds, and the like, yield polymers with terminal functional groups, which have replaced the lithium atoms, on the several polymer branches. Polymers of this type can be cured easily to form a tight network by reaction with various polyfunctional reagents. As an example, low molecular weight liquid polybutadiene containing multiple carboxy groups can be cured to a solid polymer with polyfunctional aziridinyl compound or a polyfunctional epoxy compound.

Illustrative of the foregoing discussion and not to be interpreted as a limitation on the materials herein employed or on the scope of my invention, the following examples are provided.

EXAMPLE I

Multifunctional polymerization initiators were prepared by reacting secondary-butyllithium, butadiene, and divinylbenzene. The recipe was as follows:

| | |
|---|---:|
| Toluene, ml. | 100 |
| 1,3-butadiene, grams (0.17 moles) | 9 |
| Sec-butyllithium, g. mmoles [1] | 18 |
| Divinylbenzene, g. mmoles | 18 |
| Temperature, ° F. | 158 |
| Total time, min. | 40 |

[1] Gram millimoles.

The first initiator, hereinafter designated as initiator A, was prepared according to the invention. The butadiene, sec-butyllithium, and toluene were charged to the reactor and allowed to react at 158° F. for 25 minutes. The divinylbenzene was then charged and the reaction was continued for 15 minutes. The second initiator, hereinafter designated as initiator B, was prepared by charging all ingredients initially and allowing them to react at 158° F. for 40 minutes. Both reactions were conducted in an atmosphere of nitrogen.

Block copolymers of butadiene and styrene were prepared using initiators A and B. The polymerization recipe was as follows:

| | |
|---|---|
| Cyclohexane, parts by weight | 760 |
| 1,3-butadiene, parts by weight | 70 |
| Styrene, parts by weight | 30 |
| Initiator, meq. Li per 100 grams monomer | Variable |
| Temperature, ° F. | 158 |
| Time, hours | 3 |

Cyclohexane was charged first and the reactor was then purged with nitrogen. Butadiene was added followed by the styrene and then the initiator. The temperature was adjusted to 158° F. for the polymerization. After 3 hours a 10 weight percent solution of the antioxidant, 2,2′-methylene-bis(4-methyl-6-tert-butylphenol), in a mixture of equal parts by volume of toluene and isopropyl alcohol was added. The amount of antioxidant solution added was sufficient to provide one part by weight of the antioxidant per 100 parts by weight of the polymer. The polymer was coagulated in isopropyl alcohol, separated, and dried. Quantitative monomer conversion was obtained in all runs. Inherent viscosity, gel. and Mooney value (MS–4 at 212° F.) were determined. Runs 1 to 4 were made with Initiator A, runs 5 to 8, with Initiator B. Results were as follows:

| | Run | | | |
|---|---|---|---|---|
| | 1 | 2 | 3 | 4 |
| Initiator A, mehm [1] | 6 | 4.5 | 3 | 2 |
| Inherent viscosity [2] | 0.45 | 0.63 | 0.81 | 1.09 |
| Gel, percent [3] | 0 | 0 | 0 | 0 |
| MS–4 at 212° F.[3] | Not measured, polymers very soft | | | 60 |
| | 5 | 6 | 7 | 8 |
| Initiator B, mehm [1] | 6 | 4.5 | 3 | 2 |
| Inherent viscosity | 0.92 | 1.08 | 1.53 | 2.48 |
| Gel, percent | 0 | 0 | 0 | 0 |
| MS–4 at 22° F. | 44 | 73 | 105 | Slipped |

[1] Milliequivalents of lithium/100 grams monomer.
[2] Determined according to U.S. 3,278,508, col. 20, notes (a) and (b).
[3] ASTM D 1646-63.

These data show that polymers prepared using the initiator of the invention had a much lower molecular weight for a given initiator level, as evidenced by inherent viscosity and Mooney viscosity data, than those polymers prepared using Initiator B. In other words, products with a desired Mooney value can be prepared with a much lower initiator level when the initiator of the invention is used than can be obtained with Initiator B.

EXAMPLE II

Two multifunctional initiators were prepared according to this invention and one in which all initiator components were charged initially. Each of the initiators was then employed for the polymerization of butadiene. At the conclusion of each polymerization, carbon dioxide was introduced for the purpose of producing carboxy telechelic polymers. Following the carbon dioxide treatment, each reaction mixture was acidified with dilute hydrochloric acid and washed with water to remove excess acid and initiator residues. Isopropyl alcohol was added to clarify the solution. The polymer was recovered by stripping under vacuum in a stream of nitrogen at a temperature of about 212° F. Recipes for preparing the initiators, polymerization recipes, and results in terms of carboxy content, and poise viscosity of the polymers were as follows:

| | Run | | |
|---|---|---|---|
| | 1 | 2 | 3 |
| Initiator preparation: | | | |
| Step 1: | | | |
| 1,3-butadiene, parts by weight | [4] 10 | [5] 20 | 49 |
| Cyclohexane, parts by weight | 160 | 160 | 160 |
| sec-Butyllithium, mhm.[1] | 40 | 40 | 40 |
| Divinylbenzene, mhm.[1] | | | 30 |
| Temperature, ° F. | 158 | 158 | 158 |
| Time, minutes | 40 | 40 | 40 |
| Step 2: | | | |
| 1,3-butadiene, parts by weight | [4] 10 | | |
| Divinylbenzene, mhm.[1] | 30 | 30 | |
| Temperature, ° F. | 158 | 158 | |
| Time, minutes | 20 | 20 | |
| Polymerization: | | | |
| Step 3: | | | |
| Cyclohexane, parts by weight | 580 | 580 | 580 |
| 1,3-butadiene, parts by weight | 80 | 80 | 80 |
| Temperature, ° F. | 158 | 158 | 158 |
| Time, minutes | 20 | 20 | 25 |
| Polymer properties: | | | |
| Carboxy content, percent [2] | 1.60 | 1.59 | 1.69 |
| Poise viscosity at 77° F.[3] | 102 | 103 | 160 |

[1] Gram millimoles per 100 grams total monomer in system.
[2] Based on the method of J. S. Fritz and N. M. Lisicki, Analytical Chemistry 23, 589 (1951).
[3] Brookfield Synchro-Lectric Viscometer, Model RVF.
[4] 0.18 mole.
[5] 0.37 mole.

The products from the three runs were liquids but those from runs 1 and 2, i.e., prepared according to the invention, had a lower molecular weight (poise viscosity) than the product from Run 3.

EXAMPLE III

The products from Runs 1 and 2 were cured with a difunctional epoxide (Epon 828, a condensation polymer of epichlorohydrin and bisphenol-A, equivalent weight of 187 based on epoxy content, manufactured by Shell Chemical Corporation). The several ingredients were mixed, cured 24 hours at 90° C., and the gel content determined. Recipes for curing and gel content were as follows:

| | Run | |
|---|---|---|
| | 1 | 2 |
| Polymer sample, grams | 5 | 5 |
| Chromium 2-ethylhexoate, grams | 0.032 | 0.034 |
| Epon 828, grams | 0.335 | 0.332 |
| Gel, percent | 49 | 21 |

The above Examples II and III effectively demonstrate production of a polymer initiated with the multifunctional initiator of this invention and the curing of these branched polymers to a tight polymer network.

As will be evident to those skilled in the art, various modifications of this invention can be made or followed, in light of the discussion and disclosure herein set forth, without departing from the scope and spirit thereof.

I claim:

1. A polymerization process comprising polymerizing at least one polymerizable monomer wherein said polymerizable monomer is a conjugated diene containing from 4 to 12 carbon atoms per molecule, monovinyl-substituted aromatic compound containing from 8 to 20 carbon atoms per molecule, or mixture thereof, under polymerization conditions at a temperature in the range of about −100 to 300° F., employing a multifunctional organolithium polymerization initiator in the range of about 0.25 to 100 milliequivalents of lithium per 100 grams of polymerizable monomer charged to said polymerization process,
   wherein said multifunctional polymerization initiator is that prepared by the process comprising:
   (a) reacting an organomonolithium compound with a polymerizable additive in the presence of an inert diluent,
      wherein said polymerizable additive is a conjugated diene containing 4 or 5 carbon atoms per molecule, a monovinyl-substituted aromatic compound containing from 8 to 20 carbon atoms per molecule, or mixtures thereof, said organomonolithium compound is RLi wherein R contains from 2 to 20 carbon atoms per molecule and is an aliphatic, cycloaliphatic, or aromatic radical, or combination thereof, and thereafter (b) reacting the product mixture from said step (a) with a polyvinyl aromatic compound

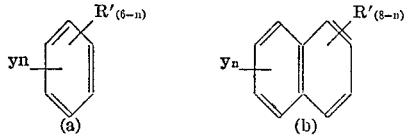

or

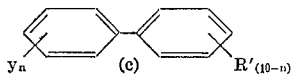

wherein y is a vinyl group and each R' is hydrogen or alkyl containing from 1 to 4 carbon atoms such that the total of all alkyl substituents contains not more than 12 carbon atoms, $n$ is an integer of 2 or 3, and wherein the mole ratio of said polymerizable additive to said organomonolithium compound RLi is in the range of about 2:1 to 15:1 and the mole ratio of said polyvinyl aromatic compound to said organolithium compound RLi is in the range of about 0.15:1 to 2:1.

2. The process of claim 1 including treatment of the resulting polymer therein produced with carbon dioxide or epoxy compounds to yield polymers with terminal functional groups.

3. The process as defined in claim 1 wherein said polymerizable monomer is a conjugated diene containing from 4 to 12 carbon atoms per molecule, or said mixture thereof with said monovinyl-substituted aromatic compound containing from 8 to 20 carbon atoms per molecule; and wherein in said step (a) said polymerizable additive is said conjugated diene containing 4 or 5 carbon atoms per molecule.

4. The process of claim 3 wherein the mole ratio of said polymerizable additive to said organomonolithium compound RLi is in the range of about 4:1 to 12:1, the mole ratio of said polyvinyl aromatic compound to said organomonolithium compound RLi is in the range of about 0.25:1 to 1:1, and said steps (a) and (b) are conducted at a temperature in the range of about 85° F. to 300° F. for a time of about 5 seconds to 24 hours per each of said steps (a) and (b).

5. The process of claim 4 wherein said organomonolithium compound is sec-butyllithium, wherein said polymerizable additive is butadiene, and wherein said polyvinyl-substituted aromatic compound is divinylbenzene, and wherein said process is conducted in the presence of a diluent of toluene or cyclohexane, and wherein said polymerization temperature is at least 85° F., and wherein the concentration of said initiator is in the range of about 1 to 50 milliequivalents of lithium per 100 grams of monomer charged to the polymerization system.

6. The process of claim 2 wherein said inert diluent is a hydrocarbon or polar compound or mixture thereof, and where hydrocarbon is paraffin, cycloparaffin, or aromatic, containing from 4 to 10 carbon atoms per molecule, and where polar is ether, thioether, or tertiary amine.

7. The process of claim 4 wherein a portion of said polymerizable additive further is employed in said step (b), such that a portion of said polymerizable additive is employed in each of said steps (a) and (b).

8. The process of claim 6 wherein said polymerization process is conducted in the presence of a hydrocarbon diluent, and said hydrocarbon diluent is a paraffin, cycloparaffin, aromatic, or mixture thereof, compound containing from 4 to 10 carbon atoms per molecule.

References Cited

UNITED STATES PATENTS

| 3,135,716 | 6/1964 | Uraneck et al. | 260—94.2 M |
| 3,157,604 | 11/1964 | Strobel | 260—94.2 M |
| 3,280,084 | 10/1966 | Zelinski et al. | 260—94.2 |

JAMES A. SEIDLECK, Primary Examiner

U.S. Cl. X.R.

252—431; 260—83.7, 93.5, 880

UNITED STATES PATENT OFFICE

CERTIFICATE OF CORRECTION

Patent No. 3,644,322   Ralph C. Farrar   Dated: February 22, 1972

It is certified that error appears in the above-identified patent and that said Letters Patent are hereby corrected as shown below:

Claim 6, column 8, line 19 (line 1 of claim 6), after "claim" and before "wherein" delete "2" and insert --- 4 ---.

Signed and sealed this 18th day of July 1972.

(SEAL)
Attest:

EDWARD M. FLETCHER, JR.
Attesting Officer

ROBERT GOTTSCHALK
Commissioner of Patents